Jan. 6, 1959 J. KRUITHOF 2,867,691

CROSSBAR SWITCH

Filed Jan. 28, 1953 3 Sheets-Sheet 1

INVENTOR
JAKOB KRUITHOF

BY Robert Harding Jr.

ATTORNEY

INVENTOR
JAKOB KRUITHOF
BY
ATTORNEY

INVENTOR
JAKOB KRUITHOF

BY Robert Harding Jr.
ATTORNEY

United States Patent Office 2,867,691

Patented Jan. 6, 1959

2,867,691

CROSSBAR SWITCH

Jakob Kruithof, Antwerp, Belgium, assignor to International Standard Electric Corporation, New York, N. Y., a corporation of Delaware Application January 28, 1953, Serial No. 333,738

Claims priority, application Netherlands April 28, 1952

10 Claims. (Cl. 179—27.54)

This invention relates to a crossbar switch and more particularly to a magnetic crossbar switch.

Magnetic coordinate switches are already known in which groups of coils are arranged to cross one another forming a coordinate array of crossing points at which sets of contacts of magnetic material are located and made to respond to the electromagnetic fluxes produced by said coils. Such an arrangement is described in the U. S. Patent No. 2,187,115.

Another type of magnetic switch is disclosed in U. S. Patent No. 2,667,542 where groups of loops of magnetic material are arranged to cross one another at right angles and each crossing point is embraced by a coil. When the latter coil is suitably energized, transfer of energy can take place between two coils respectively located on the two loops which cross one another at the point where the coil embracing the crossing is energized.

The object of the invention is to realize a magnetic crossbar switch comprising two groups of bars of magnetic material, coils mounted on each of said bars and contact mechanisms operable in response to the energization of a coil mounted on a bar of the first group and one mounted on a bar of the second group.

In accordance with a feature of the invention, two groups of bars are arranged to cross each other to form a coordinate array of crossing points, said bars being made of magnetic material, airgaps being provided at said crossing points, displaceable armatures mounted on said bars being located in said airgaps, and one or more coils being provided on each of said bars, whereby the energization of one or more of said coils on at least one bar of one group and at least one bar of the other group, may cause a flux in an airgap corresponding to the energized coils, sufficient to displace the armature thereat.

In accordance with another feature of the invention, the bars of one group are arranged in pairs, airgaps being provided between the paired bars at the level of each bar from the other group, whereby displaceable armatures in said airgaps and mounted on the bars of said other group, may be moved in two opposite senses.

The above mentioned and other objects and features of the invention will become more apparent and the invention itself will be best understood by referring to the following description of embodiments taken in conjunction with the accompanying drawings wherein.

Figure 1:
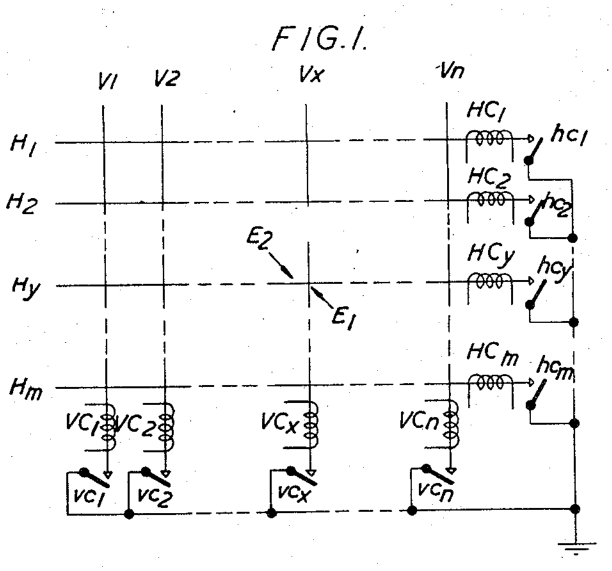
Fig. 1 is a diagrammatic representation of a first embodiment of the invention.

Referring to Fig. 1, two groups of parallel bars $V_1 \ldots V_n$ and $H_1 \ldots H_m$ are diagrammatically shown, of which the first group $V_1 \ldots V_n$ are arranged vertically, while those of the second group $H_1 \ldots H_m$ are horizontal. Together, they provide a plurality of crossing points, i. e. $m \times n$, the bars of one group being located in a plane parallel and adjacent to that in which those of the second group are laid. Coils $VC_1 \ldots VC_m$ and $HC_1 \ldots HC_m$ are respectively mounted on each of the bars of the two groups and as the bars are made of magnetic material, the energization of a coil will bring the corresponding bar to a particular magnetic potential depending upon the ampere turns of the energized coil. There are a plurality of movable elements $vc_1 \ldots vc_n$ and $hc_1 \ldots hc_m$ associated with the corresponding coils $VC_1 \ldots VC_n$, etc. Each of these movable elements are shown as an armature contact and close upon the energization of their associated coil. Each of these elements may take any form whatsoever, provided it establishes a suitable magnetic return path between the corresponding vertical bar, i. e. $V_1$ for coil $VC_1$ and the common magnetic return, for the bars of the two groups, which is shown here as connected to ground.

Contact mechanisms (not shown), are located at each crossing point between a vertical and a horizontal bar, and by energizing the two coils corresponding to a horizontal and a vertical bar, said contact mechanism can be operated. For example, the energization of coils $VC_x$ and $HC_y$ will result in the operation of a set of contacts located at the crossing point between the bars $V_x$ and $H_y$. When said two coils are energized, the movable elements $vc_x$ and $hc_y$ are closed, thereby establishing a direct magnetic path through the closed loop or common return lead which is also made of magnetic material.

Figure 2:
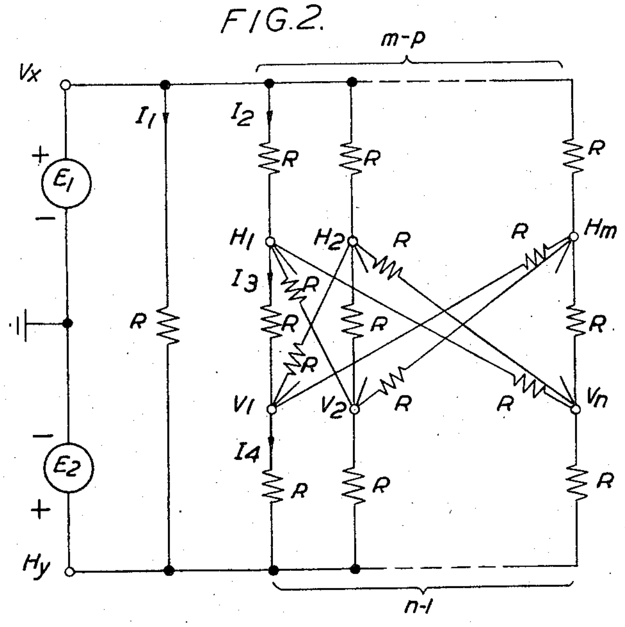
Fig. 2 is a schematic representation of an equivalent circuit of a magnetic network corresponding with the embodiment diagrammatically represented in Fig. 1.

Assuming that only the airgaps between any vertical bar and any horizontal bar whose coils have been energized have sufficiently low reluctance to be taken into account, all other airgaps including those provided by the open movable elements such as $vc_1$, offer maximum high reluctance, the corresponding equivalent magnetic circuit for the arrangement shown schematically in Fig. 1, is shown in Fig. 2. In Fig. 2 it is also assumed that since the reluctance of the bars and of the common return path is negligible, it can be neglected in comparison with the reluctance of the airgaps between a vertical bar and a horizontal bar, which airgaps are the only ones taken into account.

Referring to Fig. 2, it is seen that the network shown is a correct representation of the embodiment of Fig. 1, R being the common reluctance of all the airgaps between a vertical and a horizontal bar, and $E_1$ and $E_2$ being the respective magneto-motive forces produced by the energized coils $VC_x$ and $HC_y$, where:

$I_1$ represents the flux in the airgap between the bars $V_x$ and $H_y$;

$I_2$ represents the flux in the airgap between the bars $V_x$ and $H_1$ or any other of the horizontal bars except $H_y$;

$I_3$ represents the flux in the airgap between the bars $H_1$ and $V_1$ or between any vertical or any horizontal bars whose coils are not energized; while $I_4$ represents the flux in the airgap between the bars $H_y$ and $V_1$ or any other vertical bar except $V_x$.

The four network equations are:

$$I_1 = \frac{E_1 - E_2}{R} \tag{1}$$

$$E_1 - E_2 = R(I_2 + I_3 + I_4) \tag{2}$$

$$I_2 = (n-1)I_3 \tag{3}$$

$$I_4 = (m-1)I_3 \tag{4}$$

These are readily solved for $I_2$, $I_3$ and $I_4$ which are given by:

$$I_2 = \frac{n-1}{m+n-1}\left(\frac{E_1 - E_2}{R}\right) = \frac{n-1}{m+n-1} I_1 \tag{5}$$

$$I_3=\frac{1}{m+n-1}\left(\frac{E_1-E_2}{R}\right)=\frac{1}{m+n-1}I_1 \quad (6)$$

$$I_4=\frac{m-1}{m+n-1}\left(\frac{E_1-E_2}{R}\right)=\frac{m-1}{m+n-1}I_1 \quad (7)$$

The flux in the airgap between the energized bars $V_x$ and $H_y$ is seen to be the most important and as a result of this flux $I_1$, the armature located in the airgap between the bars $V_x$ and $H_y$ will be displaced. On the other hand, the armatures are so designed that those located in the other airgaps cannot be displaced, or cannot be sufficiently displaced to operate their associated contact mechanism, in response to the fluxes such as $I_2$, $I_3$ and $I_4$. Thus, the arrangement of Fig. 1 permits a selective operation of a contact mechanism and can be used as a selector with a number of outlets equal to $m\times n$.

Since the number of bars will generally be appreciable, e. g. 10 vertical bars and 10 horizontal bars produce a 100-point selector, the flux $I_3$ will be small with respect to the flux $I_1$, but this is not always true for the fluxes $I_2$ and $I_4$ with respect to the flux $I_1$. The most favourable relation between the fluxes $I_2$, $I_4$ and the flux $I_1$ will be obtained when the number of vertical bars is equal to the number of horizontal bars. In this case, the fluxes $I_2$ and $I_4$ will be equal to less than half of the flux $I_1$ which is a sufficient marginal relation to permit suitable design.

A simplification of the arrangement shown in Fig. 1 can be obtained by having all bars permanently connected at one end through a common return magnetic path, thus avoiding the movable elements such as $vc_1$. In that case, referring to Fig. 2, all the bars except $V_x$ and $H_y$ will be at a common magnetic potential which is that of the common return path, e. g. ground. Therefore, the fluxes $I_2$, $I_3$ and $I_4$ will be given by:

$$I_2=\frac{E_1}{R} \quad (8)$$

$$I_3=0 \quad (9)$$

$$I_4=-\frac{E_2}{R} \quad (10)$$

By having $E_2$ equal and opposite to $E_1$, the fluxes $I_2$ and $I_4$ will be equal to half the flux $I_1$ and since flux $I_3$ is equal to 0, there is again a marginal condition of two to one, but which is this time, independent of the number of bars used.

A third possibility is to fix the magnetic potentials of all the bars except $V_x$ and $H_y$, to a definite level different from that of the common return path, e. g. ground. By fixing the magnetic potential of all the horizontal bars except $H_y$ to $\frac{2}{3}(E_1-E_2)$ and that of all the vertical bars except $V_x$ to $\frac{1}{3}(E_1-E_2)$, the fluxes $I_2$, $I_3$ and $I_4$ will be given by:

$$I_2=I_3=I_4=\frac{E_1-E_2}{3R}=\frac{I_1}{3} \quad (11)$$

In this case, the marginal relation with respect to the operative flux $I_1$ is now three to one.

For all the possibilities mentioned above, the armature located in any airgap between a vertical and a horizontal bar can, of course, be made to move either in one sense or the other, by reversing the respective polarities of the magneto-motive forces $E_1$ and $E_2$.

In accordance with all those possibilities and any other similar schemes which may be derived from them, it is, however, apparent that there are marginal operating conditions. The arrangement diagrammatically represented in Fig. 3 obviates this condition.

Figure 3:
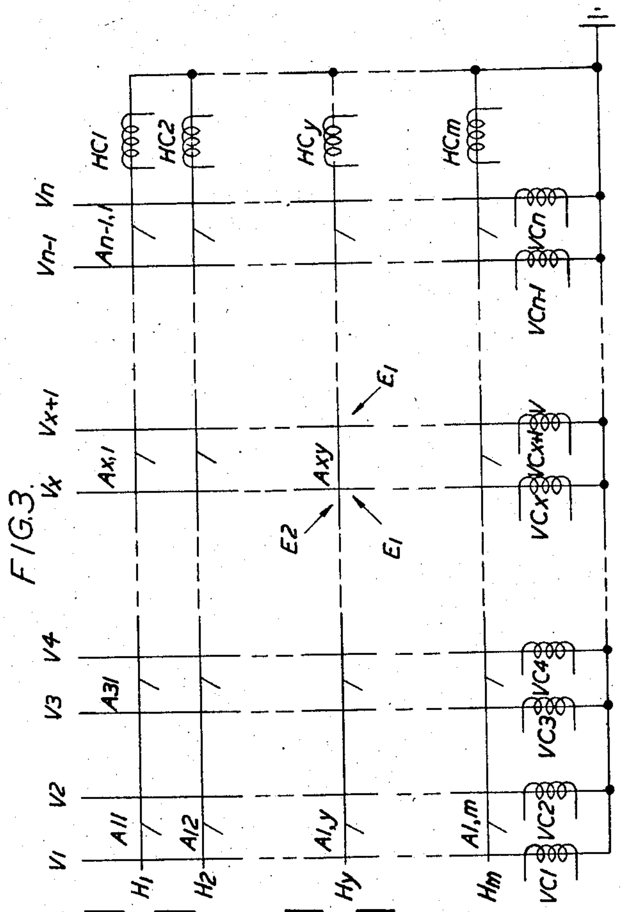
Fig. 3 is a diagrammatic representation of another embodiment of the invention.

In Fig. 3, the vertical bars are arranged in pairs $V_1$, $V_2$; $V_3$, $V_4$, etc. and airgaps are provided, by means of opposed pole pieces, between the paired vertical bars, and at the level of the various horizontal bars. Each of the horizontal bars carries a plurality of armatures, each armature cooperating with a different gap defined by a pair of opposed pole pieces. Thus horizontal bar $H_1$ carries armatures $A_{11}$, $A_{31}$ . . . $An1,1$ and bar $H_2$ carries armatures $A_{12}$ . . . $An1,2$. Each armature is located in the middle of the airgap defined by the opposed pole pieces of a pair of vertical bars. As in the second and third possibilities considered above in relation to Fig. 2, all the magnetic bars are at all times provided with a common magnetic return path which is shown in Fig. 3 as being connected to ground.

Analyzing the arrangement of Fig. 3 on the same basis as for the arrangement of Fig. 1, only the airgaps between the armature such as $A_{11}$ and the vertical bars $V_1$ and $V_2$ are taken into account, and this is again indicated by the reluctance R. Thus the reluctance between two opposite pole pieces on paired vertical bars, will be equal to 2R. The reluctances in the magnetic material will again be assumed to be negligible.

Whereas in the previous arrangements, only the coil of one vertical bar and the coil of one horizontal bar were energized, in the case of Fig. 3, to operate one armature, in one sense or the other, the coil of one horizontal bar will have to be energized and also the coils of two paired vertical bars. Assuming that the armature $A_{xy}$ has to be displaced, the coils $HC_y$, $VC_x$ and $VC_{x+1}$, will have to be energized. Assuming also that the ampere turns in coil $HC_y$ produce a magneto-motive force which brings the magnetic potential of the horizontal bar $H_y$ to $E_2$, whereas those in the coils $VC_x$ and $VC_{x+1}$ bring the corresponding vertical bars to the respective magnetic potentials $E_1$ and $E_1'$, the various fluxes $I_1$, $I_2$, $I_3$, $I_4$, which represent all possible values of fluxes for the arrangement, can be easily expressed in terms of these magnetic potentials and of the reluctances of the airgaps. This time, however, the flux in the airgap on the left-hand side of an armature has to be considered together with the flux on the right-hand side of said armatures. Calling the fluxes on the left-hand side $I_1$, $I_2$, $I_3$, $I_4$, and those on the right-hand side $I_1'$, $I_2'$, $I_3'$, and $I_4'$, these various fluxes are given by:

$$I_1=\frac{E_2-E_1}{R}-\frac{E_1-E_1'}{2R} \quad (12)$$

$$I_1'=\frac{E_2-E_1'}{R}+\frac{E_1-E_1'}{2R} \quad (13)$$

$$I_2=-\frac{E_1}{R}-\frac{E_1-E_1'}{2R} \quad (14)$$

$$I_2'=-\frac{E_1'}{R}+\frac{E_1-E_1'}{2R} \quad (15)$$

$$I_3=I_3'=0 \quad (16)$$

$$I_4=I_4'=\frac{E_2}{R} \quad (17)$$

From Equations 12, 13 as well as Equations 14, 15, the pulls on the armatures located in the airgaps subjected either to the fluxes $I_1$, $I_1'$ or $I_2$, $I_2'$, are readily given by:

$$P_1=\frac{1}{8\pi A}(I_1^2-I_1^{2\prime})=\frac{1}{4\pi R^2 A}(E_1-E_1')(E_1+E_1'-2E_2) \quad (18)$$

$$P_2=\frac{1}{8\pi A}(I_2^2-I_2^{2\prime})=\frac{1}{4\pi R^2 A}(E_1-E_1')(E_1+E_1') \quad (19)$$

where A represents the cross-section of the airgap.

From Equation 16 it is evident that there is no flux in either sense acting on the armatures located between any non-energized horizontal bars and any non-energized vertical bars (Fig. 2). Also, although there are fluxes acting in the airgaps between the energized horizontal bar, i. e. $H_y$, and any of the non-energized vertical bars, these fluxes are in opposite directions and there is accordingly no magnetic pull on the corresponding armatures, since from Equation 17, these fluxes are equal.

Since, when the coils $HC_y$ and $VC_x$, $VC_{x+1}$ are energized, only armature $A_{xy}$ is to move to the exclusion of the other armatures located between the energized vertical bars $VC_x$, $VC_{x+1}$ and any non-energized horizontal bar, the resultant pull acting on those other armatures should be made equal to zero. From Equation 19, this leads to the condition that $E'_1$ should be equal and opposite to $E_1$. The condition $E_1=E'_1$ would also lead to the magnetic pull $P_2$=zero, but obviously it cannot be used since from Equation 18 the magnetic pull $P_1$ would also be equal to zero and the armature $A_{xy}$ would not be operated.

By imposing the condition that the magnetic potentials $E_1$ and $E'_1$ given to the paired vertical bars should be equal and opposite, only armature $A_{xy}$ is operated, there being no resulting magnetic pulse on the armatures located in other airgaps. Using this condition in Equation 18 it becomes:

$$P_1=-\frac{E_1E_2}{\pi R^2 A} \qquad (20)$$

Therefore, if it is desired to move the armature $A_{xy}$ to the left, the magnetic potentials $E_1$ and $E_2$ should be of opposite polarity. For moving said armature to the right, these respective polarities should be reversed.

The detailed embodiment shown in Fig. 4 will now be explained. This corresponds to the diagrammatic representation given in Fig. 3.

Figure 4:
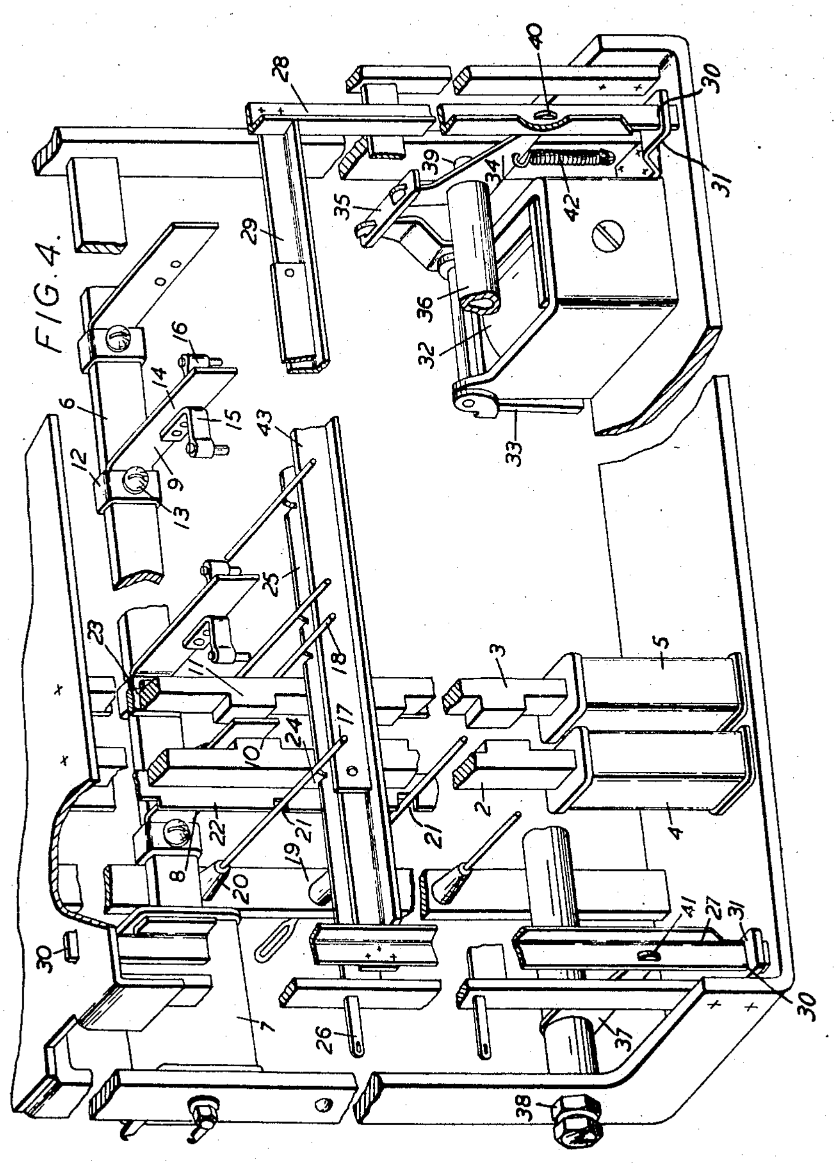
Fig. 4 is a perspective view of part of the embodiment diagrammatically represented in Fig. 3.

In Fig. 4, a frame 1 of magnetic material is shown, on the horizontal base of which the various paired vertical bars such as 2, 3 are mounted. Coils such as 4 and 5 are respectively mounted on the vertical bars 2 and 3 at their bottom ends. The horizontal bars are mounted in a similar manner on the common magnetic frame 1, but this time on one vertical flank of the latter. Only one horizontal bar 6 has been shown, and thereon is mounted the corresponding coil 7 at the left-hand side of the bar. The horizontal bars such as 6 and the vertical bars such as 2 and 3 are made of magnetic material and whereas the horizontal bar such as 6 bears a number of armatures such as 8 and 9, a plurality of corresponding pole pieces such as 10 and 11 may be arranged spaced along the length of the vertical bars such as 2 and 3. The armature such as 9 is preferably made of sufficiently light material to be resilient enough to eliminate the necessity of providing any hinge arrangement with a separate armature spring. It is made of a T-shaped flat piece, which is bent as shown and the top part of the T, 12, is further bent so that it is made to clamp around the horizontal bar 6. The armatures are anchored to bar 6 by means of screws 13. The vertical branch of the T, 14, carries two opposite contact operating members 15 and 16 which are made of suitable insulating material and normally rest near the contact springs such as 17 and 18 which cooperate with the armature 8. These contact springs 17 and 18 consist of rods which are resiliently mounted on a support bar such as 19. The springs 17, 18 are electrically insulated from bar 19 by means of the insulated bushings 20, and are pre-tensioned in such a way that they tend to be driven in a downward direction and also to the right, for contact spring 17 and to the left, for contact spring 18. The contact spring 17 is held within a slot 21 provided in an insulated vertical member 22 which may be mounted with the corresponding vertical bar 2. A similar vertical member 23 is mounted on the vertical bar 3 and is used to hold the contact springs 18 by means of slots similar to slot 21 in vertical member 22.

Upon the energization of coils 4, 5 and 7 in the manner previously described in relation to Fig. 3, the armature 8 will be made to move due to the resulting flux between the pole pieces 10 and 11 and by means of its contact operating members 15 or 16 will push the contact springs 17 or 18 outwardly so as to disengage one or the other from the slots in the vertical members 22 and 23. Assuming that the polarity of the magnetic potential to which the vertical bar 2 has been brought is opposite to that of the horizontal bar 6, the armature 8 will be driven towards the left in the direction of the pole piece 10. Hence it is the contact spring 17 which will be displaced out of the slot 21. As soon as this occurs, due to its pretension, the contact spring 17 slides downwardly against the edge of the vertical member 22 until it is arrested in the V-notch 24 cut in the horizontal member 25, there being similar notches in that member 25 for the other contact springs. The member 25 is made of conducting material and as a result of the displacement of the armature 8 to the left, an electric contact has thus been closed between the contact spring 17 and the terminal 26.

As shown, there is a horizontal member 25, corresponding with each horizontal bar such as 6. The arrangement shown can thus be operated as a selector having a number of points equal to the product of the number of horizontal bars by the number of vertical bars.

The arrangement can also be used as a recorder and one or more digits can be registered. This is due to the fact that a latching arrangement is used, and therefore a plurality of contact springs such as 17 can be successively and/or simultaneously operated to register one or more digits. For example, if the number of horizontal bars is six and the number of vertical bars eighteen, eighteen digits can be registered in accordance with a bi-quinary code which necessitates 5+1=6 separate bars. Any other code can, of course, be used.

As soon as a contact spring such as 17 has been actuated, the coils which were energized to produce the displacement of the corresponding armature, may be de-energized but the contact spring will remain latched in notch 24 in its actuated position.

The release arrangement which is used in common for the entire switch, consists of a frame comprising two vertically movable upright members 27 and 28, which are joined by horizontal tie members such as 29. One tie member 29 is used for each horizontal row of contact springs such as 17 and is located slightly below the level of such contact springs when they are in their actuated position, i. e. inside the V notch such as 24. The upper and lower ends of the vertical members 27 and 28 are movably disposed within slots 30 of guide elements 31, of which only the lower elements 31 are shown, the slots 30 of the pairs of upper and lower guide elements being in register. The members 27 and 28 and their tie member 29 are therefore free to move up and down, in response to the energization or de-energization of the servo magnet 32. Magnet 32 has a cooperating armature 33 which is coupled to members 27, 28 by means of a drawbar 35 and a rocking lever 34. Lever 34 is made integral with a rod 36 which provides a fixed coupling between said lever 34 and the lever 37. The rod 36 is pivoted on the frame 1 at opposite points 38 and 39. The end 40 of lever 34 is inserted into an opening in the vertical member 38, whereas the free end 41 of the lever 37 is inserted in an opening in the vertical member 27. An armature restoring spring 42 acts on the armature 33 through the drawbar 35 and the lever 34 and normally retains the members 27, 28 in their downward or resting position. When it is desired to release the switch, the servo magnet 32 is operated and the frame comprising the two vertical members 27 and 28 are lifted, whereby the insulated bars 43 mounted on each of the horizontal tie bars 29, will urge upwardly and out of the notches 24 those contact springs 17 which have previously been operated, causing the latter to be returned within the slots; the springs 21, being moved upward first under the lifting action of the bar 43 and then laterally within the notches 21 under their own pretension.

The switch shown in Fig. 4 can also be used as a multi-switch, with a plurality of inlets and a plurality of outlets. In that case, each inlet might for example correspond with each horizontal bar such as 6 and therefore also with each horizontal bar such as 25, the electrical circuits pertaining to the inlet being connected to terminal 26. For such a use, since several connections would have to be maintained through the multiple switch and be independent of one another, the release arrangement should be individual to the inlets and the restoring arrangement shown in Fig. 4 would have to be multiplied by the number of inlets and be operative on only one of those, e. g. operative only on bar 29.

It will be realized by those skilled in the art, that the elementary analysis presented for explaining the operation of the switch, is of a very simplified nature since it only takes into account the airgaps between any vertical and any horizontal bar. There are, of course, other airgaps such as those between adjacent bars of the same type, which have some influence, especially if in view of obtaining a compact switch, the bars are spaced close to one another. Also, the simplified analysis, neglects fringing and leakage of the flux at the gaps.

Experimental results have shown however that the magnetic crossbar switch described can be suitably designed starting with the principles enunciated from this disclosure and, in particular, the arrangement shown in Figs. 3 and 4 which, in accordance with the simple theory, is operated without regard to marginal conditions, comes very close to this expectation, the unwanted fluxes being considerably smaller than the wanted operative flux. One of the main subsidiary effects observed, is that the operative flux at the cross point of the energized bars, is apt to vary in accordance with the location of said bars, i. e. it is higher near the energized coils. This effect is particularly noticeable when the bars are rather long, which is the case for a switch or a recorder having a large capacity. In that case, the use of two oppositely energized coils at each end of the bars has been found to produce a very substantial decrease in the non-uniformity of the operative fluxes, whereby much smaller variations are observed.

Figure 5:
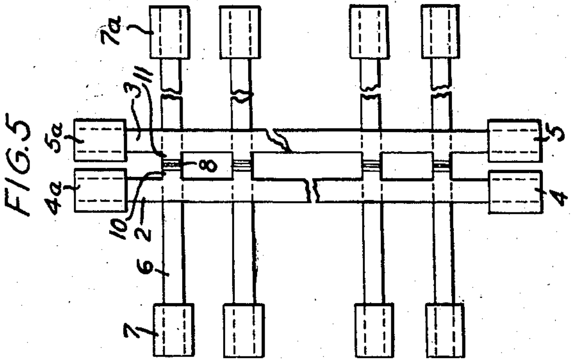
Fig. 5 is a diagrammatic representation of a modification of the showing of Fig. 4.

Fig. 5 is a diagrammatic representation of a pair of vertical bars 2, 3, which cooperate with a plurality of horizontal bars 6. Each of the horizontal bars 6 have windings 7 and 7*a* disposed at opposite ends thereof and which coils are adapted to be energized in the same direction thus producing substantially uniform flux along the length of the bars 6. The vertical bars 2 and 3 are similarly provided with pairs of windings 4, 4*a*, 5, 5*a* disposed at opposite ends thereof. The windings 4 and 4*a* are adapted to be energized in a first direction and the windings 5 and 5*a* are adapted to be energized in the opposite direction.

It is also evident that the magnetic return path formed by the frame 1 (Fig. 1) is not essential in all cases, since there will be, in any event, airgaps at the bottom of the coils such as 4 and 5 which permit the magnetic circuits to be completed through the air. Hence, the use or partial use of such a magnetic return path is best determined by experimental results. Also, the coils need not necessarily be mounted at the ends of the bars.

While the principles of the invention have been described above in connection with specific apparatus, it is to be clearly understood that this description is made only by way of example and not as a limitation on the scope of the invention.

I claim:

1. A cross-bar switch comprising a plurality of groups of contacts coordinately arranged, two groups of bars of magnetic material coordinately disposed in spaced planes to form an array of crossing points adjacent said contacts, a plurality of groups of contact actuating elements, each element adapted to actuate a different one of said contacts, a different group of said elements coupled to each bar in the first of said bar groups, means for selectively inducing a magnetic flux between given bars in each of said bar groups thereby to displace an actuating element adjacent the cross-point of said given bars.

2. A cross-bar switch as claimed in claim 1, further comprising a frame, the bars of each of said groups fixedly mounted to said frame.

3. A cross-bar switch as claimed in claim 1, wherein said means for selectively inducing a magnetic flux between given bars in each of said bar groups comprises a plurality of energizing coils, each mounted around a different one of said bars adjacent an end thereof.

4. A cross-bar switch as claimed in claim 1, wherein said means for selectively inducing a magnetic flux between given bars in each of said bar groups comprises a pair of energizing coils, mounted around each of said bars adjacent opposite ends thereof.

5. A cross-bar switch as claimed in claim 1, wherein the bars of one group are arranged in pairs, each of said pairs having a plurality of air gaps, each gap coordinate with a different bar of the other group, each of said contact actuating elements adapted to extend into a different one of said air gaps, said elements adapted to be selectively displaced in either direction in said air gaps.

6. A cross-bar switch as claimed in claim 5, wherein each of said bar pairs are provided with magnetic energizing means which are adapted to magnetize each bar of a pair in opposite sense whereby the magnetic pull on unselected contact actuating elements is equal and opposite and wherein upon magnetization of a given bar of said first bar group, the contact actuating element, adjacent the crossing point of said given bar and an energized pair of said bars is caused to be displaced in a given direction in said air gap.

7. A cross-bar switch as claimed in claim 1, wherein said contact actuating elements comprises an armature and a pair of contact operating members attached to opposite sides of said armature in operating relation with different ones of said contacts.

8. A cross-bar switch as claimed in claim 7, wherein said contacts comprise a plurality of movable and fixed contacts, said fixed contacts extending in spaced parallel planes, said planes parallel to the planes of the bars of said first groups, said movable contacts extending in spaced parallel planes normal to the planes of both said bar groups.

9. A cross-bar switch as claimed in claim 8, wherein said movable contacts are pre-tensioned to contact said fixed contacts, and further comprising latch means to normally maintain said movable contacts in latched position out of contact with said fixed contacts, said contact actuating elements adapted to release given of said movable contacts from latched position upon displacement thereof.

10. A cross-bar switch as claimed in claim 9, further comprising restoring means common to a group of said contact actuating elements, said restoring means adapted to restore any released movable contacts to latched position, and means for selectively actuating said restoring means.

References Cited in the file of this patent

UNITED STATES PATENTS

| | | |
|---|---|---|
| 2,187,115 | Ellwood et al. | Jan. 16, 1940 |
| 2,331,514 | Stibitz | Oct. 12, 1943 |
| 2,589,806 | Hickman | Mar. 18, 1952 |
| 2,604,542 | Hersey | July 22, 1952 |
| 2,667,542 | Wright | Jan. 26, 1954 |